United States Patent [19]

Tomisawa et al.

[11] Patent Number: 4,594,703
[45] Date of Patent: Jun. 10, 1986

[54] CLOCK-SIGNAL REPRODUCING CIRCUIT INCLUDING VOLTAGE CONTROLLED OSCILLATOR

[75] Inventors: Norio Tomisawa; Shinji Aoshima, both of Hamamatsu, Japan

[73] Assignee: Nippon Gakki Seizo Kabushiki Kaisha, Hamamatsu, Japan

[21] Appl. No.: 658,263

[22] Filed: Oct. 5, 1984

[30] Foreign Application Priority Data

Oct. 14, 1983 [JP] Japan .......................... 58-157935[U]

[51] Int. Cl.⁴ .......................... G11B 5/02; G11B 5/09; G11B 27/36; H03L 7/00
[52] U.S. Cl. ........................................ 369/59; 331/17; 331/27; 360/51; 360/55; 360/39
[58] Field of Search ...................... 369/59; 360/32, 39, 360/55, 51; 331/10, 11, 17, 27; 340/347 DD

[56] References Cited

U.S. PATENT DOCUMENTS

| | | | |
|---|---|---|---|
| 4,338,683 | 7/1982 | Furukawa et al. | 369/59 X |
| 4,388,596 | 6/1983 | Yamashita | 360/51 X |
| 4,404,530 | 9/1983 | Stryer | 331/17 X |
| 4,495,474 | 1/1985 | Nishikawa et al. | 331/11 |

FOREIGN PATENT DOCUMENTS 2067819 7/1981 United Kingdom .................. 369/59

OTHER PUBLICATIONS

A Long Play Digital Audio Disk System; Journal of the Audio Engineering Society, vol. 27, No. 12, by Doi et al., Dec. 1979.

Primary Examiner—Raymond F. Cardillo
Assistant Examiner—Alyssa H. Bowler
Attorney, Agent, or Firm—Spensley, Horn, Jubas & Lubitz

[57] ABSTRACT

A simplified clock-signal reproducing circuit for reproducing a clock signal from a repetitive pulse signal or a digital signal such as an EFM signal read from a compact disc as a data recording medium of the compact disc digital audio system is provided. A voltage-controlled oscillator generates a first repetition signal, and a second repetition signal is formed from the first repetition signal, the second repetition signal being the clock signal. The repetitive pulse signal is latched by a first latch in response to the clock signal, and a signal which is a delayed output of the first latch is latched by a second latch in response to the clock signal. A voltage representing a phase difference between a clock signal in the repetitive pulse signal and the clock signal generated by the voltage-controlled oscillator is generated in accordance with a first phase difference between the input and output signals of the first latch and a second phase difference between input and output signals of the second latch. This voltage is applied to the voltage-controlled oscillator to thereby control the frequency of the first repetition signal so that the first and second phase differences become equal to each other and that the clock signal generated by the voltage-controlled oscillator and the clock signal existing in the repetitive pulse signal coincide in phase with each other.

6 Claims, 2 Drawing Figures

4,594,703

CLOCK-SIGNAL REPRODUCING CIRCUIT INCLUDING VOLTAGE CONTROLLED OSCILLATOR

BACKGROUND OF THE INVENTION

1. Field of the Invention

This invention relates to a clock-signal reproducing circuit for reproducing a clock signal from a repetitive pulse signal or a digital signal, the clock signal representing minimum cycle of the repetitive pulse signal.

2. Prior Art

In the reproduction of musical information recorded in a compact disc in a compact disc player of the compact disc digital audio system as a digital audio system, an EFM (Eight to Fourteen Modulation) signal read from a compact disc is processed in accordance with a clock signal reproduced from the EFM signal, the clock signal dividing the time length of one frame of the EFM signal into 588 bit times. Although there have been proposed many kinds of clock-signal reproducing circuits for reproducing such clock signals, those conventional clock-signal reproducing circuits are rather complicated in construction and costly.

SUMMARY OF THE INVENTION

It is therefore an object of the present invention to provide a clock signal reproducing circuit for reproducing a clock signal from a repetitive pulse signal or a digital signal which is simple in construction and can be manufactured at less costs.

It is another object of the present invention to provide such a clock-signal reproducing circuit in which a clock signal accurately synchronized with the repetitive pulse signal can be reproduced.

These and other objects of this invention will become apparent from the following description taken in connection with the accompanying drawings.

According to the present invention there is provided a clock-signal reproducing circuit for reproducing a clock signal from a repetitive pulse signal or a digital signal comprising a voltage-controlled oscillator for generating a first repetition signal of which frequency varies in accordance with a voltage of a control signal applied thereto; a circuit responsive to the first repetition signal for outputting a second repetition signal which is synchronized with the first repetition signal, the second repetition signal being the clock signal reproduced; a first latch for latching the repetitive pulse signal responsive to the reproduced clock signal; a first phase-difference detector for detecting a first phase difference between the repetitive pulse signal and an output signal of the first latch; a second latch responsive to the reproduced clock signal for latching a delayed signal which is a delayed output of the first latch; a second phase-difference detector for detecting a second phase difference between the delayed signal and an output signal of the second latch; a voltage generating circuit responsive to the signals outputted from the first and second phase-difference detectors for generating a voltage as the control signal. The voltage represents a phase difference between a clock signal in the repetitive pulse signal and the reproduced clock signal, and is of such a value that the voltage-controlled oscillator generates the first repetition signal having such a frequency to cause the first and second phase differences to coincide with each other and that the reproduced clock signal coincides in phase with the clock signal in the repetitive pulse signal.

DESCRIPTION OF THE PREFERRED EMBODIMENT OF THE INVENTION

Figure 1:
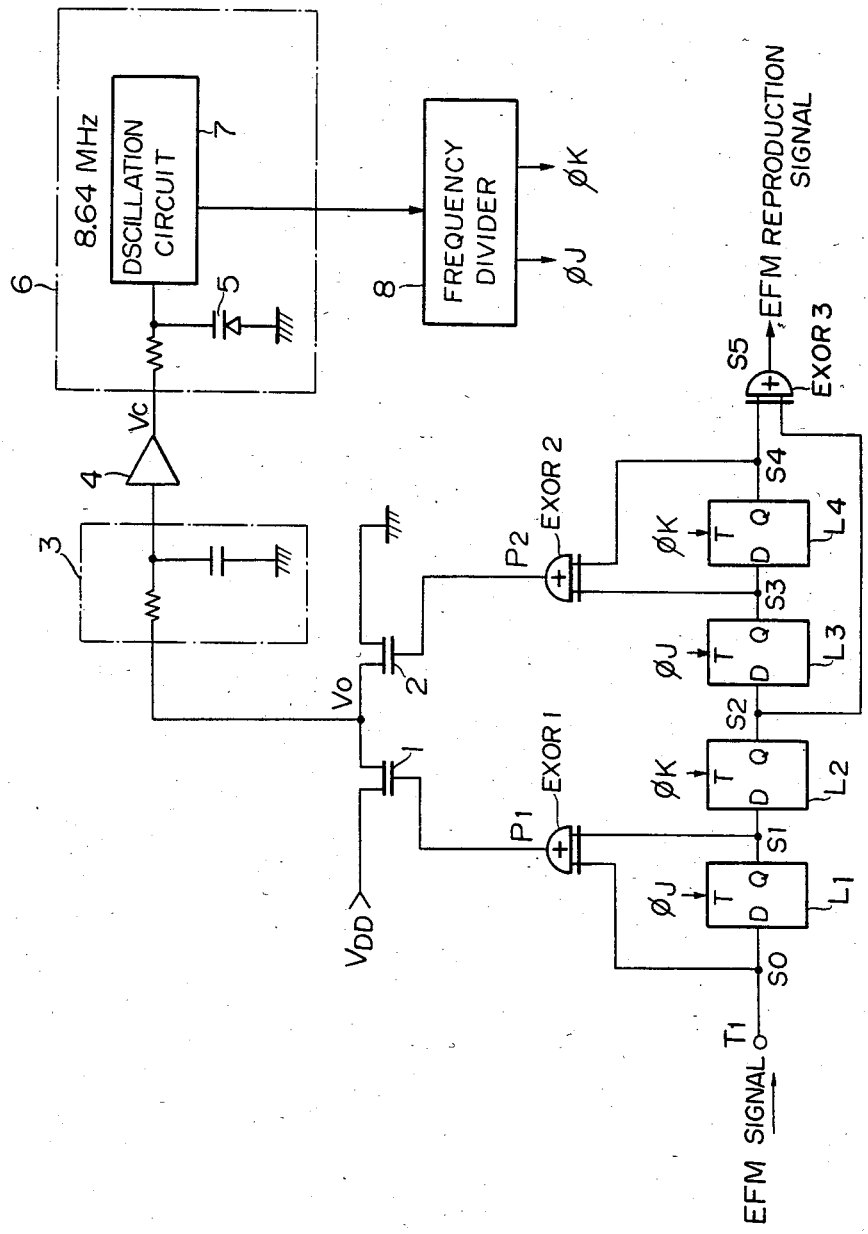
FIG. 1 is a circuit diagram of a clock-signal reproducing circuit provided in accordance with the present invention.

FIG. 1 shows a clock-signal reproducing circuit for use in a compact disc player of the compact disc digital audio system provided in accordance with the present invention. This clock-signal reproducing circuit comprises four latches L1 to L4 serially connected. An EFM signal S0 read from a compact disc in the form of pulse signals is applied via an input terminal T1 to a data input terminal D of the firststage latch L1. Each of the latches L1 to L4 is of the type that is triggered to input a data signal at its data input terminal D at a leading edge of a clock pulse applied to its clock input terminal T. A clock signal $\phi J$ reproduced from the EFM signal S0 is applied to each of the clock input terminals T of the latches L1 and L3 while a clock signal $\phi K$ reproduced from the EFM signal S0 and being 180° out of phase with the clock signal $\phi J$ is applied to each of the clock input terminals T of the latches L2 and L4. The latches L1 and L3 and the latches L2 and L4 are therefore triggered alternately by the respective clock signals $\phi J$ and $\phi K$, so that the EFM signal S0 is loaded onto the latch L1 and then shifted along the latches L1 through L4 at time intervals of half of a period of the clock signal $\phi J$ ($\phi K$).

An exclusive OR circuit EXOR1 inputs the EFM signal S0 fed to the first-stage latch L1 and a signal S1 outputted from the latch L1, and outputs a pulse signal P1 having a pulse width corresponding to a phase difference between the two signals S0 and S1 at the time when the EFM signal S0 rises and falls. Similarly, an exclusive OR circuit EXOR2 inputs a signal S3 outputted from the third-stage latch L3 and a signal S4 outputted from the fourth-stage latch L4, and outputs a pulse signal P2 having a pulse width corresponding to a phase difference between the two signals S3 and S4 at the time when the EFM signal S0 rises and falls. The phase difference between the signals S3 and S4 is always equal to half of the period of the clock signal $\phi J$ ($\phi K$), and therefore the pulse width of the pulse signal P2 is also equal to half of the period of the clock signal $\phi J$ ($\phi K$). However, the pulse width of the signal P1, that is the phase difference between the EFM signal S0 and the signal S1 outputted from the latch L1, varies in accordance with the phase difference between the EFM signal S0 and the clock signal $\phi J$.

The output signals P1 and P2 of the exclusive OR circuits EXOR1 and EXOR2 are applied to gates of FETs (field effect transistors) 1 and 2, respectively, the FETs 1 and 2 being serially connected between a voltage source $V_{DD}$ and the ground. A voltage V0 appearing at a connecting point of the two FETs 1 and 2, i.e., a voltage at a source of the FET 1 or at a drain of the FET 2, is rendered $V_{DD}$ when the FET 1 conducts with the FET 2 being in a cutoff state. The voltage V0 becomes zero when the FET 2 conducts with the FET 1 being in a cutoff state, and becomes $V_{DD}/2$ when the both FETs 1 and 2 are in cutoff states. The FETs 1 and 2 do not conduct simultaneously, since the input signals of the exclusive OR circuits EXOR1 and EXOR2 are separated from each other by the latches L2 and L3.

The voltage V0 is supplied to a filter circuit 3 to be smoothed, and an output voltage of the filter circuit 3 is fed via a buffer amplifier 4 to a variable-capacitance diode 5 provided in a voltage-controlled oscillator (hereinafter referred to as VCO) 6. The VCO 6 comprises an oscillation circuit 7 for generating a repetition signal whose frequency varies in accordance with the capacitance of the variable-capacitance diode 5. This VCO 6 is so arranged that the frequency of the repetition signal outputted from the oscillation circuit 7 increases when an output voltage of the buffer amplifier 4, i.e., a control voltage Vc applied to the VCO 6, varies in the positive direction. The repetition signal is fed to a frequency divider 8 which divides the frequency of the repetition signal by two to output the clock signals $\phi J$ and $\phi K$.

A signal S2 outputted from the second-stage latch L2 and the signal S4 outputted from the fourth-stage latch L4 are inputted to an exclusive OR circuit EXOR3. This exclusive OR circuit EXOR3 forms an EFM reproduction signal S5 and output it to associated circuits.

Figure 2:
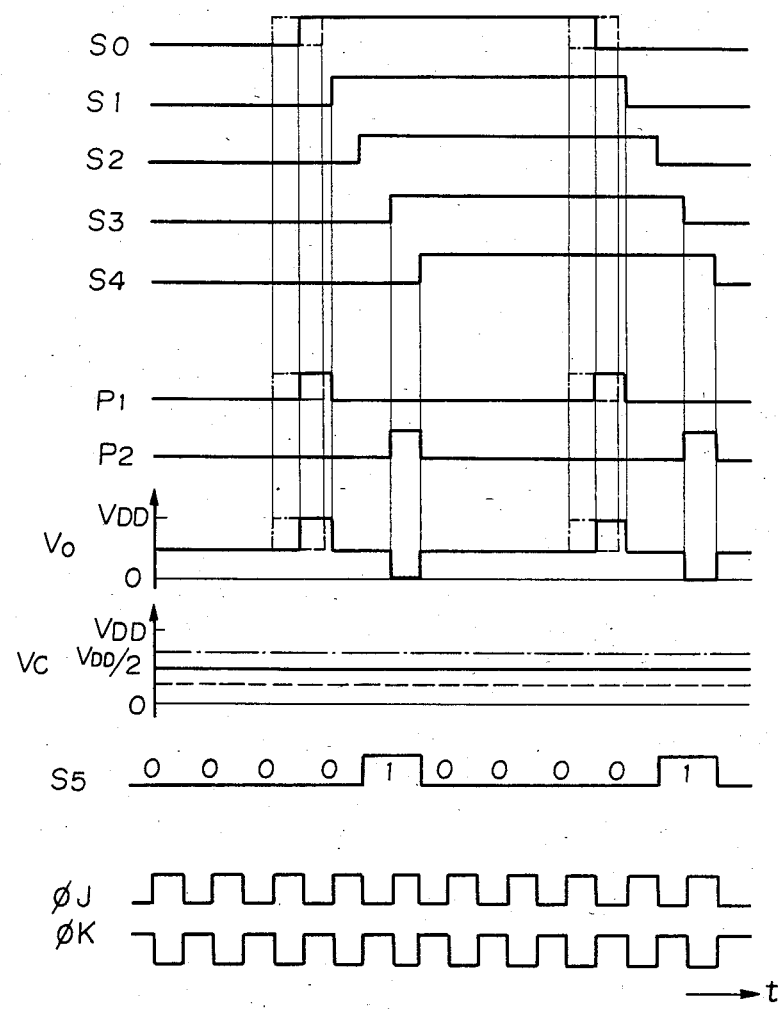
FIG. 2 is a time chart of various signals appearing in the circuit of FIG. 1.

FIG. 2 shows waveforms of the respective signals appearing in the above described clock-signal reproducing circuit. The latches L1 and L3 are triggered at a leading edge of each pulse of the clock signal $\phi J$ while the latches L2 and L4 are triggered at a leading edge of each pulse of the clock signal $\phi K$, and therefore the EFM signal S0 read from the disc is loaded onto the latch L1 to output the signal S1 at a leading edge of each pulse of the clock pulse $\phi J$ irrespective of any advance and delay of phase of the EFM signal S0, as shown in FIG. 2. The output signal S1 of the latch L1 is loaded onto the latch L2 at a leading edge of each pulse of the clock signal $\phi K$, and the output signal S2 of the latch L2 is loaded onto the latch L3 at a leading edge of each pulse of the clock signal $\phi J$, and the output signal S3 of the latch L3 is loaded onto the latch L4 at a leading edge of each pulse of the clock signal $\phi K$. Thus, the EFM signal S0 loaded onto the latch L1 is shifted along the latches L2 through L4 at time intervals of half of the period of the clock signal $\phi J$ ($\phi K$).

The input signals of the exclusive OR circuit EXOR2 are the signals S3 and S4 respectively outputted from the latches L3 and L4, and therefore the pulse width of each of the pulse signals P2 outputted from the circuit EXOR2 is always equal to half of the period of the clock signal $\phi J$ ($\phi K$). In contrast, the exclusive OR circuit EXOR1 inputs the EFM signal S0 read from the disc and the signal S1 outputted from the latch L1, and therefore the pulse width of each of the pulse signals P1 outputted from the exclusive OR circuit EXOR1 varies in accordance with the phase difference between a leading or trailing edge of the EFM signal S0 and a leading edge of the corresponding clock signal $\phi J$. The pulse width of the signal P1 varies within one cycle range of the period of the clock signal $\phi J$. When a leading edge of the EFM signal S0 coincides with a trailing edge of the corresponding clock signal $\phi J$ as indicated in solid line in FIG. 2, the pulse width of the signal P1 outputted from the circuit EXOR1 is rendered equal to half of the period of the clock signal $\phi J$ ($\phi K$). In this case, a positive going pulse and a negative going pulse of the voltage V0 appearing at the connecting point of the FETs 1 and 2 become equal in time length to each other, so that the control voltage Vc obtained by smoothing the voltage V0 and applied to the VCO 6 becomes $V_{DD}/2$.

When the frequency of the EFM signal S0 decreases, the phase of the EFM signal S0 is delayed with respect to those of the clock signals $\phi J$ and $\phi K$, as indicated in a broken line in FIG. 2, so that the pulse width of the signal P1 outputted from the circuit EXOR1 becomes less than half of the period of the clock signal $\phi J$ ($\phi K$). In this case however, the exclusive OR circuit EXOR2 outputs signal P2 having a pulse width of half of the period of the clock signal $\phi J$ ($\phi K$), and therefore the pulse width of the positive going pulse of the voltage V0 becomes less than that of the negative going pulse of the voltage V0. As a result, the control voltage Vc decreases, so that the frequency of the repetition signal outputted from the VCO 6 also decreases, thereby the frequency of the clock signal $\phi J$ and $\phi K$ being decreased so as to follow the frequency of the EFM signal S0.

In contrast, when the frequency of the EFM signal S0 increases, the EFM signal S0 is advanced in phase with respect to the clock signals $\phi J$ and $\phi K$, as indicated in dot-and-dash line in FIG. 2, so that the pulse width of the signal P1 becomes greater than half of the period of the clock signal $\phi J$ ($\phi K$). In this case however, the exclusive OR circuit EXOR2 outputs signal P2 having a pulse width of half of the period of the clock signal $\phi J$ ($\phi K$), and therefore the pulse width of the positive going pulse of the voltage V0 becomes greater than that of the negative going pulse of the voltage V0. As a result, the control voltage Vc increases, so that the frequency of the repetition signal outputted from the VCO 6 also increases, thereby the frequency of the clock signal $\phi J$ and $\phi K$ being increased so as to follow the frequency of the EFM signal S0. Thus the frequency of the clock signal $\phi J$ and $\phi K$ is controlled so that the leading and trailing edges of the EFM signal S0 are kept to be at the middle point between leading edges of the corresponding two adjacent pulses of the clock signal $\phi J$.

In a compact disc player, clock signals $\phi J$ and $\phi K$ each having 588 pulses need to be reproduced per one frame of EFM signal, and the time length of one (1) frame of the EFM signal is 136 $\mu$sec when a predetermined linear speed of the compact disc is obtained by a disc servo-control system. The frequency of the clock signal $\phi J$ and $\phi K$ should therefore be (588)/(136 $\mu$sec)=4.32 MHz. From this it is appreciated that the VCO 6 should generate a repetition signal of 8.64 MHz.

Although four stages of latches L1 to L4 are provided in the above-described clock-signal reproducing circuit, the number of stage of the latches is not restricted to four. Actually however, if there is provided no latch between the inputs of the exclusive OR circuits EXOR1 and EXOR2, the pulse signal P1 outputted from the circuit EXOR1 can overlap with the pulse signal P2 outputted from the circuit EXOR2 due to the propagation delays of the relevant circuits, although the duration of the overlap may be very short. Therefore, it is preferable to provide at least one latch between the inputs of the exclusive OR circuits EXOR1 and EXOR2. With the structure of the embodiment of FIG. 1, two latches L2 and L3 are provided between the inputs of the exclusive OR circuits EXOR1 and EXOR2, and the EFM reproduction signal S5 (FIG. 2) is formed by the exclusive OR circuit EXOR3 in accordance with the signal S2 appearing at the connecting point of the two latches L2 and L3 and the signal S4 outputted from the last-stage latch L4.

What is claimed:

1. A clock-signal reproducing circuit for reproducing a clock signal from a repetitive pulse signal comprising:
   (a) voltage-controlled oscillator means for generating a first repetition signal of which frequency varies in accordance with a voltage of a control signal applied thereto;
   (b) circuit means responsive to said first repetition signal for outputting a second repetition signal which is synchronized with said first repetition signal, said second repetition signal being the clock signal;
   (c) first latch means for latching the repetitive pulse signal responsive to the clock signal;
   (d) first phase-difference detector means for detecting a first phase difference between the repetitive pulse signal and an output signal of said first latch means;
   (e) second latch means responsive to the clock signal for latching a delayed signal which is the output of said first latch means delayed by a predetermined period of time;
   (f) second phase-difference detector means for detecting a second phase difference between the delayed signal and an output signal of said second latch means; and
   (g) voltage generating means responsive to signals outputted from said first and second phase-difference detector means for generating a voltage as said control signal, said voltage being of such a value that said voltage-controlled oscillator means generates said first repetition signal having such a frequency to cause said first and second phase differences to coincide with each other.

2. A clock-signal reproducing circuit according to claim 1, wherein said first and second phase-difference detector means comprise first and second exclusive OR circuits, respectively, and said voltage generating means comprises first and second field effect transistors serially connected between first and second voltage sources and a filtering circuit for smoothing a voltage appearing at a connecting point of said first and second field effect transistors, gates of said first and second field effect transistors being driven by outputs of said first and second exclusive OR circuits, respectively, a voltage outputted from said filtering circuit being said control signal.

3. A clock-signal reproducing circuit according to claim 2, wherein said voltage-controlled oscillator means comprises a variable-capacitance diode and an oscillation circuit whose oscillation frequency varies in accordance with a capacitance of said variable-capacitance diode, said variable-capacitance diode being supplied with said voltage outputted from said filtering circuit, an oscillation output of said oscillation circuit being said first repetition signal.

4. A clock-signal reproducing circuit according to claim 1, wherein said circuit means for outputting said second repetition signal comprises a frequency divider for dividing a frequency of said first repetition signal by two to output first and second pulse signals which signals are 180° out of phase with each other, said first and second pulse signals being fed to said first and second latch means, respectively.

5. A clock-signal reproducing circuit according to claim 4 further comprising third and fourth latch means serially connected between said first and second latch means, said third latch means latching the output of said first latch means in response to said second pulse signal, said fourth latch means latching an output of said third latch means in response to said first pulse signal, the output of the fourth latch means being said delayed signal.

6. A clock-signal reproducing circuit according to claim 5, said repetitive pulse signal being an Eight to Fourteen Modulation signal read out from a compact disc as a recording medium of the compact disc digital audio system; and further comprising an exclusive OR circuit for being supplied with the outputs of said second and third latch means to output an EFM reproduction signal.

* * * * *